(12) United States Patent
Barański et al.

(10) Patent No.: US 11,614,988 B2
(45) Date of Patent: Mar. 28, 2023

(54) VARIABLE MEMORY DIAGNOSTICS

(71) Applicant: Carrier Corporation, Palm Beach Gardens, FL (US)

(72) Inventors: Rafal Barański, Gdańsk (PL); Szymon Irzabek, Gdańsk (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 191 days.

(21) Appl. No.: 17/099,948

(22) Filed: Nov. 17, 2020

(65) Prior Publication Data
US 2021/0149756 A1 May 20, 2021

(30) Foreign Application Priority Data
Nov. 20, 2019 (EP) .................................... 19210443

(51) Int. Cl.
*G06F 11/00* (2006.01)
*G06F 11/07* (2006.01)
*G05B 19/042* (2006.01)
*G06F 3/06* (2006.01)
*G06F 9/48* (2006.01)
*G08B 17/10* (2006.01)

(52) U.S. Cl.
CPC .......... *G06F 11/079* (2013.01); *G05B 19/042* (2013.01); *G06F 3/0604* (2013.01); *G06F 3/0653* (2013.01); *G06F 3/0673* (2013.01); *G06F 9/4843* (2013.01); *G06F 11/0727* (2013.01); *G06F 11/0736* (2013.01); *G06F 11/0751* (2013.01); *G08B 17/10* (2013.01); *G05B 2219/24024* (2013.01)

(58) Field of Classification Search
CPC ............... G06F 11/079; G06F 11/0727; G06F 11/0736; G06F 11/0751
See application file for complete search history.

(56) References Cited

U.S. PATENT DOCUMENTS

| | | | | |
|---|---|---|---|---|
| 6,813,728 | B1 * | 11/2004 | Baessler | G06F 11/261 714/25 |
| 2014/0237208 | A1 | 8/2014 | Colbert | |
| 2016/0012918 | A1 * | 1/2016 | Mun | G11C 29/44 714/718 |
| 2021/0149756 | A1 * | 5/2021 | Baranski | G06F 3/0673 |

FOREIGN PATENT DOCUMENTS

CN 109086162 A 12/2018

OTHER PUBLICATIONS

European Search Report for Application No. 19210443.8; dated Jun. 8, 2020; 10 Pages.

* cited by examiner

*Primary Examiner* — Philip Guyton
(74) *Attorney, Agent, or Firm* — Cantor Colburn LLP

(57) ABSTRACT

A method is provided for diagnostic checking of a variable memory 14 in a safety critical system in order to detect variable memory failures; wherein the safety critical system comprises a central processing unit (CPU) with an operating system, an internal volatile memory 12 and an external volatile memory 14 including the variable memory 14; and the CPU can access a plurality of address spaces including one or more address spaces of the external volatile memory 14 that are utilised by the operating system and/or by a safety critical application of the safety critical system during normal use of the safety critical system.

12 Claims, 1 Drawing Sheet

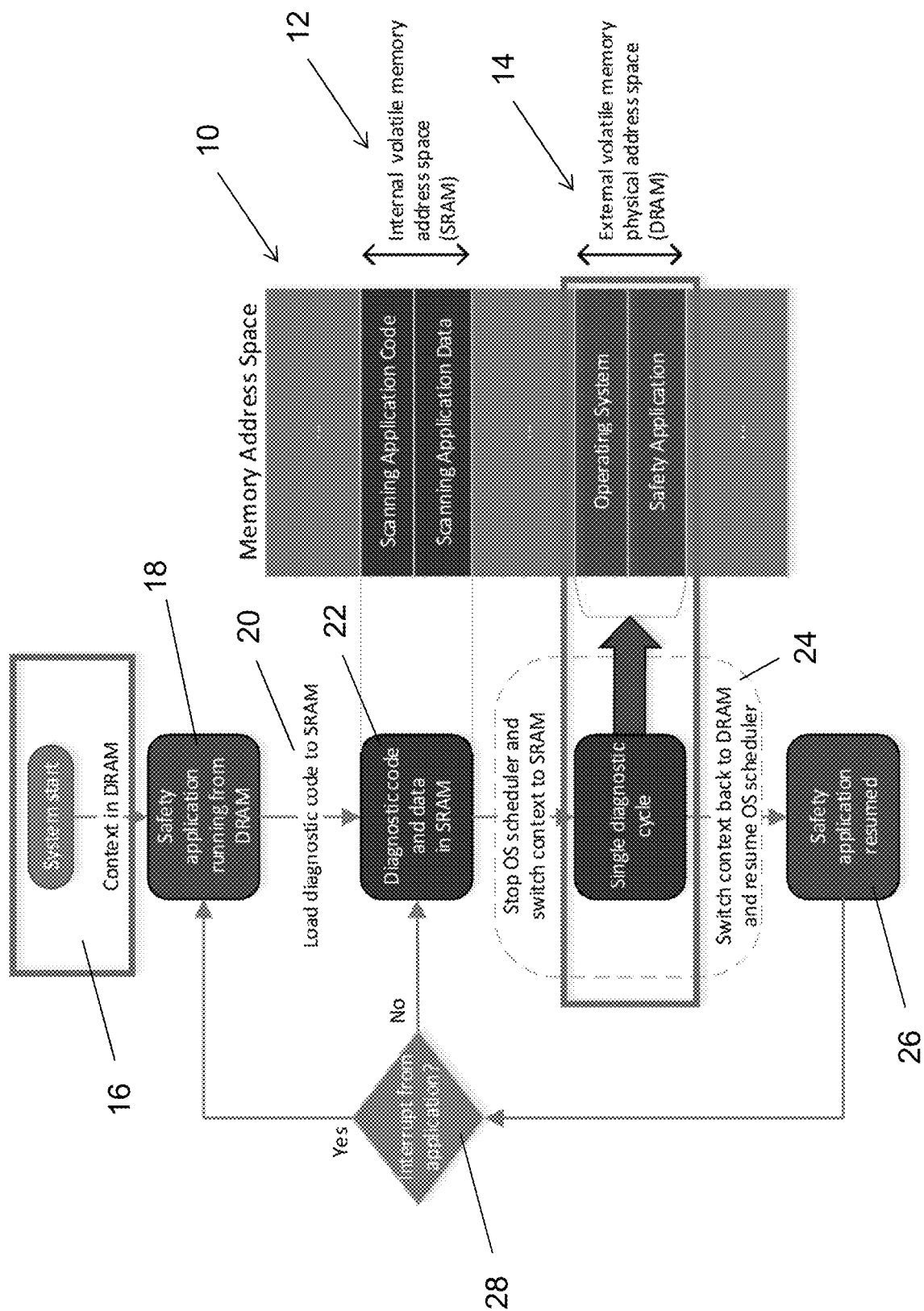

VARIABLE MEMORY DIAGNOSTICS

FOREIGN PRIORITY

This application claims priority to European Patent Application No. 19210443.8, filed Nov. 20, 2019, and all the benefits accruing therefrom under 35 U.S.C. § 119, the contents of which in its entirety are herein incorporated by reference.

TECHNICAL FIELD

The present invention relates to a method for diagnostic checking of a variable memory in a safety critical system, such as for example a variable memory of a fire safety system. The diagnostic checking is done in order to detect variable memory failures. The invention also relates to corresponding devices and computer programme products.

BACKGROUND

It is important with any system to be able to reliably detect failures, and with safety critical systems the can be more significant, with requirements for the system to fail-safe and to be able to operate using diagnostic techniques in accordance with applicable industry standards. For systems with a variable memory, typically involving a central processing unit (CPU) with an operating system as well as external volatile memory, one source of random hardware failures is variable memory failure within the external volatile memory. The possibility for automatic detection of variable memory failures, via a suitable diagnostic checking method, is critical for maintaining uninterrupted performance of the safety critical system, such as uninterrupted performance of safety applications operating on the safety critical system. In a safety critical system this uninterrupted performance is of particular benefit given that the safety capabilities are generally present for the purpose of preserving human life and property, such as in the case of a fire safety system. The capability for effective monitoring in this case increases the level of system functional safety.

For programmable electronic systems one relevant standard is defined by the Safety Integrity Level (SIL) according to IEC 61508. This standard requires control of variable memory failures and automatic failure detection. The standard teaches specific diagnostic techniques, which use memory checking algorithms that require modification of the relevant variable memory areas. This can include variable memory areas being actively used by (operated on) the system, such as in the case of memory address spaces that are utilised by the operating system run on the CPU. This can require special handling of the relevant memory address spaces.

One family of existing methods runs the memory diagnostics from outside of the operating system or in a special environment. Examples include MemTest86 and MemTest86+. This requires complete reboot of the system, which is not a problem in many cases, e.g. with non-safety critical computer servers. However, the stopping of a safety critical application within a safety critical system is often not acceptable.

Another approach known from the prior art, such as COMeT and COMeT+ does not require a reboot and uses the operating system environment. However, this approach is not able to diagnose the whole variable memory physical address space, due to some memory regions being utilised by the operating system, as well as by application software and by memory diagnostics application. Thus, such systems may not reach the requirements set by standards relating to automatic detection for all sources of variable memory failures.

There is hence a need for improved methods for diagnostic checking of variable memory in safety critical systems.

SUMMARY

Viewed from a first aspect, the invention provides a method for diagnostic checking of a variable memory in a safety critical system in order to detect variable memory failures; wherein the safety critical system comprises a central processing unit (CPU) with an operating system, an internal volatile memory and an external volatile memory comprising the variable memory; and wherein the CPU can access a plurality of address spaces including one or more address spaces of the external volatile memory that are utilised by the operating system and/or by a safety critical application of the safety critical system during normal use of the safety critical system; the method comprising: (i) running a memory checking algorithm, wherein diagnostic code and data of the memory checking algorithm are in the internal volatile memory, and wherein the memory checking algorithm is for detecting variable memory failures; (ii) suspending operation of a scheduler of the operating system and switching CPU execution context to the internal volatile memory, such that the CPU utilises the internal volatile memory in place of the memory spaces of the external volatile memory that are utilised for the operating system and/or the safety critical application during normal use of the safety critical system; (iii) using the memory checking algorithm to check the memory address spaces of the external volatile memory, including those that were utilised by the operating system and/or the safety critical application, to thereby check all memory spaces of the external volatile memory; and (iv) switching CPU execution context back to the external volatile memory and resuming operation of the scheduler of the operating system.

With this method the internal volatile memory, i.e. typically a memory internal to the CPU such as SRAM, is used as an execution environment during the context switch of step (iii), so that there is no need to omit memory regions occupied by the operating system, during the diagnostic cycles of step (iii). This means that the entirety of the external volatile memory (typically DRAM associated with the CPU) can be checked whilst the operating system continues to operate, allowing uninterrupted operation of the safety critical system (and any safety applications running on the operating system) and enabling compliance with standards such as the Safety Integrity Level (SIL) according to IEC 61508. The state of the safety critical system and its applications may be preserved during the diagnostic cycle. It is notable that by putting the main operating system scheduler on hold during the context switch then it becomes possible to diagnose all memory regions used by the operating system and by any applications. The operation of the scheduler is suspended before the context switch and this should be done before checking of the memory address spaces of the external volatile memory that were utilised by the operating system.

It is to be noted that the method of the first aspect may identify memory failures, where present, in accordance with the memory checking algorithm. Thus, in the case of a variable memory failure the method will include the step of identifying the variable memory failure, such as by identifying the memory address space(s) that have failed. Remedial action can then be taken, e.g. via software or hardware adjustments, such as by suspending the use of the failed address spaces or replacing the memory. The memory checking algorithm and the associated diagnostic code may be provided in accordance with a suitable standard, such as with reference to the Safety Integrity Level (SIL) according to IEC 61508. It will be appreciated that any suitable memory checking algorithm may be used with the proposed context switch, since to some extent it is the steps associated with the context switch that provide advantages for the proposed method, rather than the features of the memory checking algorithm itself. The memory checking algorithm may be provided to the CPU in any suitable form, such as via a software update to the operating system, or an application that is run by the operating system.

The method may include disabling the physical to virtual memory address translation of the operating system during the context switch. Thus, step (iii) may comprise disabling physical to virtual memory address translation and step (iv) may comprise re-enabling memory address translation. This ensures linear testing of the memory address space of the external volatile memory. This way the tested memory regions are certain to be continuously laid in physical memory.

The safety critical system includes a safety application running from the external volatile memory. The step of switching context of the CPU may include also preserving the state of the safety application. Optionally the method may include monitoring for an interrupt from the safety application and, if an interrupt is present, pausing the execution of the diagnostic code to modify its algorithm and/or parameters. Conversely, if an interrupt from the safety application is not present then the method may continue the operation of the diagnostic code from the internal volatile memory as in step (ii).

It will be noted that for the memory address spaces not utilised by the operating system the method may include checking some or all such memory address spaces before the context switches and before checking of the memory address spaces utilised by the operating system (i.e. before steps (ii)-(iv)), and/or checking some or all such memory address spaces after the context switches (i.e. after steps (ii)-(iv)). The method preferably includes checking every memory address space, since of course this is a requirement of the safety standards, but the sequence can be varied, such as by using a linear sequence as discussed above.

The CPU and its associated internal volatile memory may take various forms. As noted above, the internal volatile memory may be SRAM. The operating system could for example be Linux based, or it may be a proprietary system developed for dedicated use with a particular safety critical system. It is an advantage of the proposed method that it may be used irrespective of the operating system type, because the design of the diagnostic checking method is not dependent on the operating system execution environment or libraries.

The method is scalable with respect to the size of the variable memory and hence there are no particular limitations for the size of the external volatile memory.

In some examples the safety critical system is a fire safety system, such as a system used for monitoring and/or management for fire safety installations within a building or vehicle. For example, the fire safety system may have functions linked to monitoring of smoke or fire sensors, triggering of alarms and/or triggering of fire suppression systems, such as the Autrosafe series of fire detection systems for buildings as marketed by Autronica Fire and Security AS of Norway. The method may hence be a method for diagnostic checking of a variable memory in a fire safety system/fire detection system.

Viewed from a second aspect, the invention extends to a safety critical system comprising a memory checking algorithm for diagnostic checking of a variable memory in the safety critical system in order to detect variable memory failures; wherein the safety critical system comprises a central processing unit (CPU) with an operating system, an internal volatile memory and an external volatile memory comprising the variable memory; and wherein the external volatile memory comprises a plurality of address spaces including one or more address spaces utilised by the operating system and/or by a safety critical application of the safety critical system during normal use of the safety critical system; the memory checking algorithm being configured to: load diagnostic code and data for the memory checking algorithm in the internal volatile memory; suspend operation of a scheduler of the operating system and switch context of the CPU to the internal volatile memory, such that the CPU utilises the internal volatile memory in place of the memory spaces of the external volatile memory that are utilised for the operating system and/or the safety critical application during normal use of the safety critical system; run the memory checking algorithm to check the memory address spaces of the external volatile memory including those that were previously utilised by the operating system, to thereby check all memory spaces of the external volatile memory; and switch context of the CPU back to the external volatile memory and resuming operation of the scheduler of the operating system.

This safety critical system thus is configured to run the memory checking algorithm to thereby perform the method of the first aspect. The memory checking algorithm may be provided to the CPU in any suitable form, such as via a software update to the operating system, or an application run by the operating system. The safety critical system may optionally include other features as set out above. For example, the memory checking algorithm may be configured to disable physical to virtual memory translation when switching context and suspending the scheduler, so that memory virtualisation is disabled during checking of the memory address spaces that were previously utilised by the operating system.

Viewed from a third aspect, the invention provides a computer programme product comprising instructions that, when executed on a safety critical system, will configure the safety critical system to carry out the method of the first aspect for diagnostic checking of a variable memory in the safety critical system in order to detect variable memory failures.

Thus, in example implementations, the safety critical system comprises a central processing unit (CPU) with an operating system, an internal volatile memory and an external volatile memory comprising the variable memory, wherein the CPU can access a plurality of address spaces including one or more address spaces of the external volatile memory that are utilised by the operating system and/or by a safety critical application of the safety critical system during normal use of the safety critical system; and the instructions may configure the safety critical system to perform a method comprising: (i) running a memory checking algorithm, wherein diagnostic code and data of the memory checking algorithm are in the internal volatile memory, and wherein the memory checking algorithm is for detecting variable memory failures; (ii) suspending operation of a scheduler of the operating system and switching CPU execution context to the internal volatile memory, such that the CPU utilises the internal volatile memory in place of the memory spaces of the external volatile memory that are utilised for the operating system and/or the safety critical application during normal use of the safety critical system; (iii) using the memory checking algorithm to check the memory address spaces of the external volatile memory including those that were utilised by the operating system and/or the safety critical application to thereby check all memory spaces of the external volatile memory; and (iv) switching CPU execution context back to the external volatile memory and resuming operation of the scheduler of the operating system.

The computer programme product may comprise the memory checking algorithm. The memory checking algorithm may be provided to the CPU in any suitable form, such as via a software update to the operating system, or an application that is run by the operating system. The instructions may configure the system to operate in accordance with any of the other features discussed above in relation to the method of the first aspect.

BRIEF DESCRIPTION OF THE DRAWINGS

Certain preferred embodiments of the present invention will now be described, by way of example only, with reference to the following drawings, in which:

FIG. 1 is a flowchart showing steps of a proposed method of diagnostic checking of a variable memory in a safety critical system;

DETAILED DESCRIPTION

An example safety critical system includes a central processing unit (CPU, not shown in the FIGURE) with an operating system, an internal volatile memory 12 and an external volatile memory 14 comprising a variable memory. The external volatile memory 14 comprises a plurality of address spaces including one or more address spaces utilised by the operating system during normal use of the safety critical system. It is required to be able to run a memory checking algorithm, for example as specified by the Safety Integrity Level (SIL) according to IEC 61508, in order to detect variable memory failures automatically during use of the safety critical system. Advantageously, the method set out herein allows for this to be done with negligible impact on the operation of the safety critical system and on any safety critical application(s) being run on the system.

As shown in FIG. 1, a method of diagnostic checking in order to detect variable memory failures for the safety critical system is as follows:

At system start 16 the context is in the external volatile memory, in this case DRAM, with the safety application running from DRAM 18. In order to perform the variable memory diagnostic then diagnostic code and data for a memory checking algorithm is loaded 20 to an internal volatile memory of the CPU, in this example SRAM.

With the diagnostic code and data of the memory checking algorithm in the internal volatile memory 22, then the memory checking algorithm is able to be used for detecting variable memory failures for memory address spaces of the external volatile memory that are not utilised by the operating system or the safety critical application. This would not however provide a full check of the memory due to the presence of memory address spaces of the external volatile memory that are being utilised by the operating system or the safety critical application.

In order to avoid the unacceptable need for a shut-down/restart of the operating system, then a context switched check 24 of the memory address spaces of the external volatile memory that were being utilised by the operating system or the safety application is carried out. This involves switching execution context of the CPU to the internal volatile memory, suspending operation of a scheduler of the operating system and disabling physical to virtual memory address translation of the operating system. With the context switched to SRAM the memory checking algorithm is able to perform diagnostic checks on the memory address spaces of the external volatile memory that were being utilised by the operating system or the safety application. The full extent of the external volatile memory (DRAM) can hence be completed whilst the running of the operating system and safety application is not interrupted.

Once the diagnostic cycle for the memory address spaces of the external volatile memory that were being utilised by the operating system has been completed then execution context of the CPU is switched back from SRAM to DRAM, with the scheduler being resumed and physical to virtual memory address translation of the operating system being re-enabled.

The method includes monitoring for an interrupt from the safety application and:

if an interrupt is present, pausing the execution of the diagnostic code to modify its algorithm and/or parameters; or if an interrupt from the safety application is not present the diagnostic checking can continue (if needed) with CPU execution context switched to the internal volatile memory.

This method enables full checking of the variable memory without any interruption to the functions of operating system with reference to the safety critical system, where the status of the safety critical system can be kept in place. It therefore allows safety critical systems, such as fire safety systems, to be implemented in accordance with strict standards for memory failure detection, such as the Safety Integrity Level (SIL) according to IEC 61508, and equivalent standards. This is not possible using pre-existing methods such as MemTest86 or COMeT since those pre-existing methods involve interruptions to the operation of the system that are not acceptable in safety critical environments.

The method for detecting variable memory faults is also provided in a fully scalable manner, for example in terms of volume of the diagnosed memory and the duration of the analysis, with the possibility of implementing new algorithms (i.e. later updates to the memory checking algorithm) without interfering with the safety-critical application and without the need to replace the operating system.

Advantageously, the proposed method does not influence the design of the safety critical system or its associated applications running on the operating system. These can work continuously without any system restart. The diagnostic application may also be implemented as a self-contained code and thus can be integrated more easily into existing systems, including as an upgrade to systems already in use. It can be used independently of the operating system type, because the design of the diagnostic checking method is not dependent on the operating system execution environment or libraries.

When the memory checking algorithm is running there is negligible impact on safety critical systems, with marginal influence on performance. With optimum settings the CPU load and average CPU utilization are stable and equal, about ~1% in tests, without visible effect on the safety critical system when diagnosis is enabled compared to when the memory checking algorithm is not running to perform the diagnostic checking of the memory. There is also high reliability due to the location of the memory checking algorithm code and data in a separate environment (SRAM) to the variable memory (DRAM), executing the diagnostic memory checking algorithm only with small coating on support logic. The reliability is further enhanced by the independence of the memory checking algorithm from the operating system and the safety critical application.

What is claimed is:

1. A method for diagnostic checking of a variable memory in a safety critical system in order to detect variable memory failures; wherein the safety critical system comprises a central processing unit (CPU) with an operating system, an internal volatile memory and an external volatile memory comprising the variable memory;

and wherein the CPU can access a plurality of address spaces including one or more address spaces of the external volatile memory that are utilised by the operating system and/or by a safety critical application of the safety critical system during normal use of the safety critical system; the method comprising:
(i) running a memory checking algorithm, wherein diagnostic code and data of the memory checking algorithm are in the internal volatile memory, and wherein the memory checking algorithm is for detecting variable memory failures;
(ii) suspending operation of a scheduler of the operating system and switching CPU execution context to the internal volatile memory, such that the CPU utilises the internal volatile memory in place of the memory spaces of the external volatile memory that are utilised for the operating system and/or the safety critical application during normal use of the safety critical system;
(iii) using the memory checking algorithm to check the memory address spaces of the external volatile memory including those that were utilised by the operating system and/or the safety critical application to thereby check all memory spaces of the external volatile memory; and
(iv) switching CPU execution context back to the external volatile memory and resuming operation of the scheduler of the operating system;
wherein step (iii) comprises disabling physical to virtual memory address translation of the operating system and step (iv) comprises re-enabling the physical to virtual memory address translation.

2. A method as claimed in claim 1, wherein the internal volatile memory is an SRAM memory internal to the CPU and the external volatile memory is DRAM associated with the CPU.

3. A method as claimed in claim 1, wherein the operation of the scheduler is suspended before the context switch and is completed before step (iii) and hence before checking of the memory address spaces of the external volatile memory that were utilised by the operating system.

4. A method as claimed in claim 1, wherein the disabling of the physical to virtual memory address translation is done before step (iii) and is done before or concurrent with switching the context of the operating system at step (ii).

5. A method as claimed in claim 1, wherein the safety critical system includes the safety application running from the external volatile memory.

6. A method for diagnostic checking of a variable memory in a safety critical system in order to detect variable memory failures; wherein the safety critical system comprises a central processing unit (CPU) with an operating system, an internal volatile memory and an external volatile memory comprising the variable memory; and wherein the CPU can access a plurality of address spaces including one or more address spaces of the external volatile memory that are utilised by the operating system and/or by a safety critical application of the safety critical system during normal use of the safety critical system; the method comprising:
(i) running a memory checking algorithm, wherein diagnostic code and data of the memory checking algorithm are in the internal volatile memory, and wherein the memory checking algorithm is for detecting variable memory failures;
(ii) suspending operation of a scheduler of the operating system and switching CPU execution context to the internal volatile memory, such that the CPU utilises the internal volatile memory in place of the memory spaces of the external volatile memory that are utilised for the operating system and/or the safety critical application during normal use of the safety critical system;
(iii) using the memory checking algorithm to check the memory address spaces of the external volatile memory including those that were utilised by the operating system and/or the safety critical application to thereby check all memory spaces of the external volatile memory; and
(iv) switching CPU execution context back to the external volatile memory and resuming operation of the scheduler of the operating system;
wherein the safety critical system includes the safety application running from the external volatile memory;
monitoring for an interrupt from the safety application and:
if an interrupt is present, the method includes pausing the execution of the diagnostic code to modify its algorithm and/or parameters;
if an interrupt from the safety application is not present the method includes continuing operation with the diagnostic code and data in the internal volatile memory.

7. A method for diagnostic checking of a variable memory in a safety critical system in order to detect variable memory failures; wherein the safety critical system comprises a central processing unit (CPU) with an operating system, an internal volatile memory and an external volatile memory comprising the variable memory; and wherein the CPU can access a plurality of address spaces including one or more address spaces of the external volatile memory that are utilised by the operating system and/or by a safety critical application of the safety critical system during normal use of the safety critical system; the method comprising:
(i) running a memory checking algorithm, wherein diagnostic code and data of the memory checking algorithm are in the internal volatile memory, and wherein the memory checking algorithm is for detecting variable memory failures;
(ii) suspending operation of a scheduler of the operating system and switching CPU execution context to the internal volatile memory, such that the CPU utilises the internal volatile memory in place of the memory spaces of the external volatile memory that are utilised for the operating system and/or the safety critical application during normal use of the safety critical system;
(iii) using the memory checking algorithm to check the memory address spaces of the external volatile memory including those that were utilised by the operating system and/or the safety critical application to thereby check all memory spaces of the external volatile memory; and (iv) switching CPU execution context back to the external volatile memory and resuming operation of the scheduler of the operating system;

wherein the memory checking algorithm is provided in accordance with the Safety Integrity Level (SIL) according to IEC 61508.

8. A method for diagnostic checking of a variable memory in a safety critical system in order to detect variable memory failures; wherein the safety critical system comprises a central processing unit (CPU) with an operating system, an internal volatile memory and an external volatile memory comprising the variable memory; and wherein the CPU can access a plurality of address spaces including one or more address spaces of the external volatile memory that are utilised by the operating system and/or by a safety critical application of the safety critical system during normal use of the safety critical system; the method comprising:

(i) running a memory checking algorithm, wherein diagnostic code and data of the memory checking algorithm are in the internal volatile memory, and wherein the memory checking algorithm is for detecting variable memory failures;

(ii) suspending operation of a scheduler of the operating system and switching CPU execution context to the internal volatile memory, such that the CPU utilises the internal volatile memory in place of the memory spaces of the external volatile memory that are utilised for the operating system and/or the safety critical application during normal use of the safety critical system;

(iii) using the memory checking algorithm to check the memory address spaces of the external volatile memory including those that were utilised by the operating system and/or the safety critical application to thereby check all memory spaces of the external volatile memory; and (iv) switching CPU execution context back to the external volatile memory and resuming operation of the scheduler of the operating system;

wherein the safety critical system is a fire safety system and the method is a method of diagnostic checking of the variable memory in the fire safety system.

9. A safety critical system comprising a memory checking algorithm for diagnostic checking of a variable memory in the safety critical system in order to detect variable memory failures; wherein the safety critical system comprises a central processing unit (CPU) with an operating system, an internal volatile memory and an external volatile memory comprising the variable memory; and wherein the CPU can access a plurality of address spaces including one or more address spaces of the external volatile memory that are utilised by the operating system and/or by a safety critical application of the safety critical system during normal use of the safety critical system; the memory checking algorithm being configured to:

load diagnostic code and data for the memory checking algorithm in the internal volatile memory;

suspend operation of a scheduler of the operating system and switch context of the CPU to the internal volatile memory, such that the CPU utilises the internal volatile memory in place of the memory spaces of the external volatile memory that are utilised for the operating system and/or the safety critical application during normal use of the safety critical system;

run the memory checking algorithm to check the memory address spaces of the external volatile memory including those that were previously utilised by the operating system or the safety application, to thereby check all memory spaces of the external volatile memory; and switch context of the CPU back to the external volatile memory and resuming operation of the scheduler of the operating system;

wherein the safety critical system is a fire safety system.

10. A fire safety critical system executing the method as claimed in claim 1, the fire safety critical system being a fire safety system for a building and having functions linked to monitoring of smoke or fire sensors, triggering of alarms and/or triggering of fire suppression systems.

11. A non-transitory computer programme product comprising instructions that, when executed on a safety critical system, will configure the safety critical system to carry out the method of claim 1 for diagnostic checking of a variable memory in the safety critical system in order to detect variable memory failures.

12. A non-transitory computer programme product as claimed in claim 11, wherein the safety critical system comprises a central processing unit (CPU) with an operating system, an internal volatile memory and an external volatile memory comprising the variable memory, wherein the CPU can access a plurality of address spaces including one or more address spaces of the external volatile memory that are utilised by the operating system and/or by a safety critical application of the safety critical system during normal use of the safety critical system; and wherein the instructions will configure the safety critical system to perform a method comprising:

(i) running a memory checking algorithm, wherein diagnostic code and data of the memory checking algorithm are in the internal volatile memory, and wherein the memory checking algorithm is for detecting variable memory failures;

(ii) suspending operation of a scheduler of the operating system and switching CPU execution context to the internal volatile memory, such that the CPU utilises the internal volatile memory in place of the memory spaces of the external volatile memory that are utilised for the operating system and/or the safety critical application during normal use of the safety critical system;

(iii) using the memory checking algorithm to check the memory address spaces of the external volatile memory including those that were utilised by the operating system and/or the safety critical application to thereby check all memory spaces of the external volatile memory; and (iv) switching CPU execution context back to the external volatile memory and resuming operation of the scheduler of the operating system.

* * * * *